Nov. 22, 1955   J. P. EUGLEY ET AL   2,724,829
GAIN CONTROL SYSTEM
Filed March 31, 1953   6 Sheets-Sheet 3

INVENTORS
JENNESS P. EUGLEY
& NEIL A. MAC INNES
BY Milton S. Winters
ATTORNEY

Nov. 22, 1955  J. P. EUGLEY ET AL  2,724,829
GAIN CONTROL SYSTEM

Filed March 31, 1953  6 Sheets-Sheet 4

*Fig. 7.*

INVENTORS
JENNESS P. EUGLEY
& NEIL A. MAC INNES
BY
ATTORNEY

United States Patent Office 2,724,829
Patented Nov. 22, 1955

2,724,829

GAIN CONTROL SYSTEM

Jenness P. Eugley, Runnemede, and Neil A. MacInnes, Haddonfield, N. J., assignors to Radio Corporation of America, a corporation of Delaware Application March 31, 1953, Serial No. 345,934

18 Claims. (Cl. 343—103)

This invention relates to radio navigation systems of the type utilizing the time difference in the propagation of radio pulses from synchronized ground stations (known as Loran systems), and particularly to an improved receiver for use with a system employing two or more pairs of transmitters or a triad transmitter system.

In the operation of a Loran system, for triad operation, a master transmitter transmits two pulses during each Loran period. Each Loran period may be identified as "L". These pulses are spaced in time by L/2, and are known respectively as X and Z pulses. A second or Y slave transmitter transmits one pulse each Loran period, this pulse being known as the Y pulse. In triad operation, a third or W slave transmitter transmits one pulse each Loran period known as the W pulse. Paired operation may also be had with the master X pulse and W slave transmitter, or with the master Z and Y slave transmitter. The X pulse is identified by a code pulse transmitted from the master station closely following the X pulse. Paired operation may also be had by a master transmitter transmitting one pulse each Loran period, and a salve transmitter transmitting one pulse spaced by L/2 from the master pulse.

By means of the receiving equipment, the operator on the craft determines the time difference between the pulses from the two transmitter stations of one pair, or between the pulses from a master transmitter and a slave transmitter of a triad, as they arrive at the receiver. Since the radio pulses travel from the ground transmitters to the receiver at a known propagation rate (i. e., at the velocity of light), it is known that the position of the craft is at some point on a curve or line corresponding to the time difference reading. By obtaining the time difference reading from a second pair of ground stations, or from the master transmitter and the second slave transmitter of a triad, a second line corresponding to the second time difference reading is obtained, and the intersect point of the two lines is the position of the craft. Special maps having the "time difference" or "Loran" lines printed thereon for the several pairs of ground stations are provided for use with the navigation system.

In order to measure the time difference in the arrival of successive pulses from two synchronized ground stations, the receiving equipment is arranged to generate pulses at selected repetition rates. The pulses may be adjusted to have a definite time relation to time of arrival of the ground station pulses and are provided for the purpose of driving or synchronizing cathode-ray deflecting circuits. The deflecting circuits produce cathode-ray sweep traces on which the received ground station pulses are displayed. These selected-repetition-rate and adjustably-delayed pulses are obtained from a system of counters and switching to be described hereinafter.

In determining the time difference between a master and slave pulse, various methods may be employed. In general, however, a pulse is generated in the receiver which may be delayed a known selected time after reception of the master pulse. The master, slave, and delayed pulses are then displayed on an oscilloscope on the same or synchronized sweep synchronized with the pulses or pedestals. The delayed pulse is brought into coincidence with the slave pulse by appropriate selection of the differential delay of the pedestals. The pedestal time differences then correspond to the received pulse time differences.

It is an object of the present invention to simplify the operation of a Loran receiver.

It is another object of the invention to facilitate the operation of determining coincidence of a delayed pulse generated in the Loran receiver.

A further object of the invention is to facilitate the operation of visually matching the delayed and slave pulses as displayed on a Loran receiver oscilloscope display.

In a Loran receiver in which the present invention is embodied, the Loran receiver is gain-controlled in synchronism with the received pulses, whether master or slave, so that the gain for any received slave pulse may be independently controlled or adjusted. In prior Loran receivers, the gain of the received pulses has been controlled differentially, so that adjustment of the gain for one slave pulse affected the adjustment of gain for the master or for the other received slave pulse, or both. Such differential gain-control made particularly difficult the operation of matching in time the slave and receiver generated pulses. These pulses are most easily matched in time occurrence when of the same or substantially the same amplitude.

In accordance with a preferred embodiment of the invention, the gain control voltage circuit includes three amplifying stages, each stage having anode, cathode, and control elements. A common load element is connected to all the anode elements. Each stage has, individual to itself, a clamping circuit connected to the control element of its respective stage to limit the positive-going excursion of a waveform applied to said control to a value preferably adjustable at will by the operator. There are developed three waveforms during each Loran cycle, each of which waveforms has a positive-going portion more positive than any other portion of that waveform, and each waveform positive-going portion occurring in a time mutually exclusive of the intervals of occurrence of the other positive-going portions. However, one positive-going portion is always occurring. Due to the common load resistor, and the fact that one of said waveforms is always in its most positive-going period, only one amplifying stage conducts at a time. The value of the output voltage is determined, for that period, by the adjustment of the clamping voltage value of that stage as adjusted by the operator. The stages conduct in an order determined by the waveforms synchronized with the master transmitter, so that one stage conducts during reception of the X pulse, a second during reception of the Y pulse, the first during reception of the Z pulse, and the third during reception of the W pulse from the transmitters. The output anode voltage is negative with respect to the usual common ground between receiver and the gain control circuits, and is D. C. coupled to the receiver grid returns as an instantaneous gain control voltage. Thus the receiver gains during the reception of master (X and Z) pulses, slave Y pulses, and slave W pulses is each controlled independently of the receiver gain during reception of the others, and without affecting the gain during reception of the others.

The foregoing and other objects, advantages, and novel features of the invention will be more fully apparent from the following description when taken in connection with the accompanying drawing, in which like reference numerals belong to like parts, and in which.

Block diagram

Figure 1:
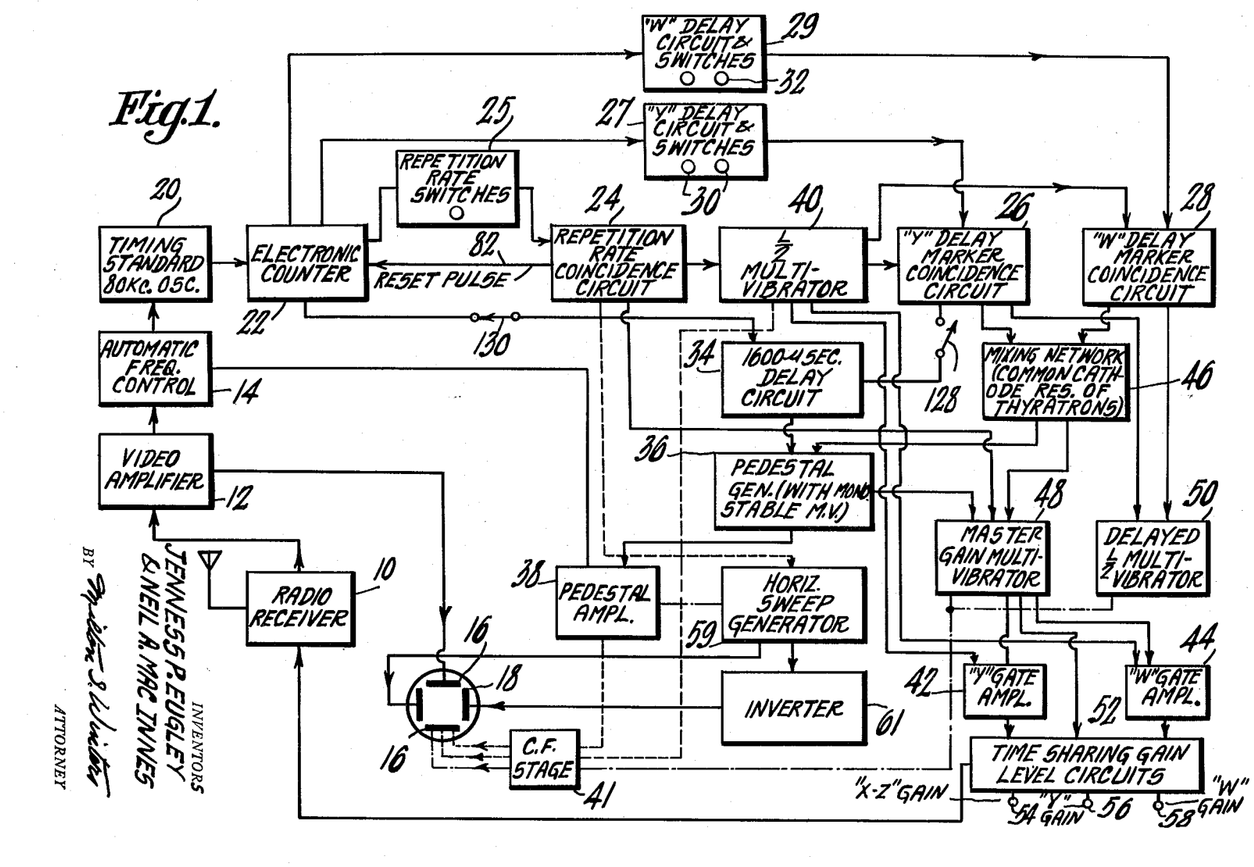
Fig. 1 is a block diagram illustrative of a Loran receiver embodying the invention.

Referring to Fig. 1, it may be assumed that the Loran receiver system is switched for triad operation, dual presentation, connected as indicated by the solid lines and for coarse reading, dotted line connections. A radio receiver 10 receives and demodulates the pulses sent out by the Loran transmitters (not shown). As will be understood, only one set of stations of a given repetition L (Loran) frequency is observed at any one time, the others drifting along on the oscilloscope screen so that the operator either does not see them or need pay no attention to them. Thus there are received and demodulated for observation X, Z, Y and W pulses from a single set of Loran triad stations. These pulses are amplified in a video amplifier 12. From the video amplifier 12 the pulses are applied to an automatic frequency control circuit 14 and to the vertical deflection plates 16 of an oscilloscope 18.

The output of the automatic frequency control circuit 14 is applied to a timing standard 20, in this case an 80 kilocycles per second crystal controlled oscillator. The automatic frequency control circuit 14 controls the oscillator frequency so that a wave form may be derived having exactly the same period as that of the master Loran station.

The timing standard 20 output is applied to an electronic counter 22. The counter 22 counts every cycle of the wave from timing standard 20 until re-set to zero as described hereinafter. A repetition rate coincidence circuit 24 is connected by switches 25 to the electronic counter 22. A Y delay coincidence circuit 26 and a W delay coincidence circuit 28 are also each connected respectively by switches 27 and 29 to the electronic counter 22. Fig. 1 is intended only as a block diagram schematic of the "signal flow" type. Therefore, the numerous connecting lines through each set of switches are indicated by only a single line on Fig. 1.

The W delay marker coincidence circuit 28 provides a pulse a known selected time after occurrence of the X pulse. Similarly the Y delay marker coincidence circuit 26 provides a pulse a predetermined known selected time after occurrence of the Z pulse. The time delay of the Y marker pulse may be selected by and read on dials 30 of Y delay switches 27 and the time delay of the W marker pulse may be selected by and read on dials 32 of W delay switches 29.

A 1600 microsecond delay circuit 34 is connected to counter 22, and times a pedestal generator 36, with a pulse delayed 1600 microseconds (approximately) after re-set time, as described more fully hereinafter.

The pedestal generator 36 provides various pedestals. It includes a monostable pulse generator triggered by the positive going edges of the 1600 microsecond delay circuit output pulse to produce "master" pedestals, and by the positive going edges of the output of the delay marker mixing network, to produce "delay" pedestals. The master pedestal has a repetition rate of twice the Loran repetition rate of the particular stations to be observed. The triggering of the monostable pulse generator therefore produces one master pulse (used as and interchangeably termed a pedestal) for each half Loran period plus a delay pedestal. These pedestals are applied by connection through an amplifier 38 to an automatic frequency control circuit 14. If the repetition frequency is off by a few microseconds per cycle, the frequency control circuit 14 corrects the discrepancy, and locks the timing standard 20, by varying the bias on a reactance tube (not shown) so that the 80 kc./s. oscillator runs at an exact multiple rate of the Loran repetition rate desired. The pedestal amplifier is also connected for "slow sweep" (coarse reading) to the vertical deflection plates 16 (dotted connection).

A Loran half-period (L/2) multivibrator 40 is tripped by the repetition rate coincidence circuit each Loran half period. This is a bistable multivibrator, and the period of the output wave is therefore that of the Loran period L. The output waveform from the L/2 multivibrator 40 is applied in opposite polarities to the Y and W delay marker coincidence circuits 26 and 28 respectively, and in opposite polarities to Y and W gate amplifiers 42 and 44. The L/2 multivibrator 40 also supplies a trace separation voltage wave to the lower deflection plate of the oscilloscope 18 for "slow" sweep (dotted line connection), through a cathode follower stage 41.

A mixing network 46, which may be a cathode resistor common to two output tubes from the Y and W delay marker coincidence circuits 26 and 28 is connected to receive the delayed output pulses from the Y and W delay marker coincidence circuits. Each delayed pulse is thus applied to the pedestal generator 36. The pedestal generator 36 output is a pedestal for each Loran half period (as previously described) and also one for each delay, the Y and W, as will be more fully apparent hereinafter. These pedestals applied to the pedestal amplifier 38 appear by the connection of the latter to oscilloscope 18 through cathode follower 41 (dotted lines) on the oscilloscope 18. The pedestals are also applied to a master gain multivibrator 48.

The master gain multivibrator 48 is connected to the Y and W gate amplifiers 42 and 44, and to a delayed L/2 multivibrator 50, the latter also receiving signals from the Y and W delay marker coincidence circuits 26 and 28. The master gain multivibrator 48 and the Y and W gate amplifiers 42 and 44 are connected to time sharing gain amplifiers 52, for the purpose of controlling the times during which each of three time sharing gain level circuits 52 will control the receiver gain, independently of the others. The time sharing gain level circuits 52 have a connection to the receiver 10, for example to one or more radio frequency or one or more intermediate frequency stages (not shown), as suitable, in order to control the receiver gain. The gain is independently controlled at one level during the received master X and Z pulses, a second level during the received Y pulse and a third level during the received W pulse, as indicated by the gain controls 54, 56, and 58 respectively appropriately labeled. Each level may be set independently of the other two levels, by the operator.

Sweep voltages are provided by a horizontal sweep generator 59 connected (in slow sweep or coarse) to the repetition rate coincidence circuit 24 to receive re-set pulses from the repetition rate coincidence circuit 24. Each re-set pulse initiates a sweep in each L/2 period. The inverter 61 provides push-pull voltage for the oscilloscope 18.

*Dual display-coarse adjustment, triad operation*

Figure 2:
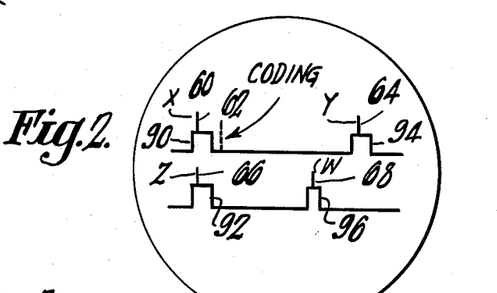
Fig. 2 is an illustrative sketch of a Loran indicator oscilloscope screen in triad operation, for dual presentation, and coarse adjustment.

The radio receiver 10 receives the pulses from the three Loran stations. These are demodulated in the video amplifier and are displayed as vertical pips on the oscilloscope 18 display screen. Referring to Fig. 2, a typical display, somewhat idealized, as illustrated in Fig. 2. Pip 60 is the X pulse from the master station. It is followed by its "coding" pulse 62. The pip 64 is from the Y slave station. Pip 66 is the Z pulse from the master station and pip 68 is the W pulse from the W station. The upper sweep starts at a fictional time zero, just before receipt of pip 60, and the lower sweep starts an L/2 period later.

*System operation*

The oscillator 20 is always feeding pulses to counter 22. The repetition rate switches 25 are set at a desired count corresponding to the Loran repetition rate of the master (and slave) stations. This repetition rate coincidence circuit may be that disclosed in the copending application of Donald J. Oda, Serial No. 250,919, filed October 11, 1951, in this case comprising eleven successive stages each of a bistable multivibrator with isolating amplifiers interposed between stages. The repetition rate switches include in fact many connections, as explained above and as shown in the said Oda application.

Figure 3:
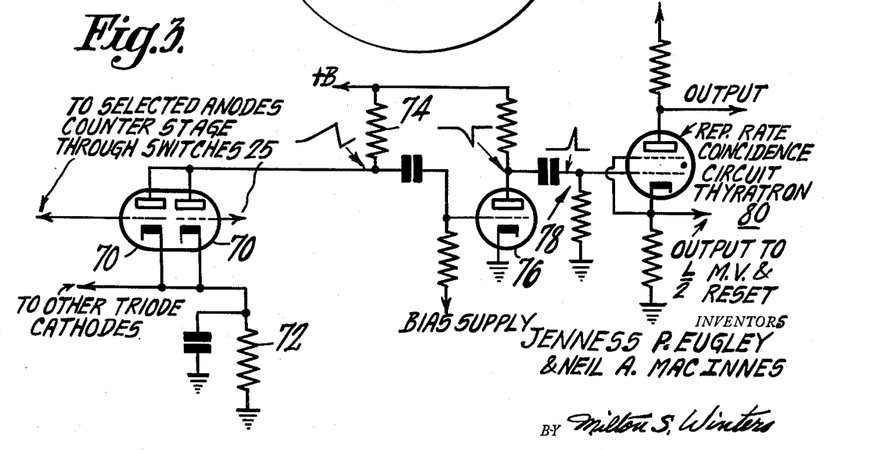
Fig. 3 is a circuit diagram schematically illustrating a Loran receiver repetition rate coincidence circuit shown in block form in Fig. 1.

Referring to Fig. 3, the repetition rate coincidence circuit 24 comprises a series of triodes 70. Only two triodes are completely shown in Fig. 3. Each triode grid is connected to a selected anode of one of the multivibrators of the counter stages by means of the repetition rate switches. The triodes 70 have a common cathode resistor 72 and a common anode resistor 74.

When all the counter anodes to which the grids of triodes 70 are connected, go negative together, all these tubes are cut off. The anode voltage at the triode anodes rises to B+, and a positive pulse is fed to an amplifier tube 76. This positive pulse has a slow rise time, due to the coupling capacitor, and a fast decay time whenever any triode again conducts. When the waveform is inverted by amplification in tube 76, and differentiated by a capacitor-resistor combination 78, a sharp positive pulse is developed. This pulse is applied to the control grid of a thyratron 80. The output from the thyratron is a sharp pulse, of about one microsecond duration. A positive polarity pulse occurs at the cathode every L/2 period. See Fig. 1a, line a. A much longer pulse of opposite polarity may be taken from the thyratron anode.

The positive output from the repetition rate thyratron cathode is returned to every counter stage to one grid thereof. The counter stages are therefore re-set, every half Loran cycle L/2, as indicated by the connection 82 of Fig. 1.

The positive pulse from the repetition rate thyratron is also applied to the bistable L/2 multivibrator 40, in a manner to cause it to assume the other of the two states from that which it was in after application of the last pulse. Thus the period of the L/2 multivibrator output is L. See Fig. 1a, line c, where the output from one anode is shown, it being understood that the opposite phase is available from the other anode of the L/2 multivibrator.

At every re-set pulse, the last stage of the binary counter produces, at one anode (the section of the binary stage re-set by the positive pulse from the repetition rate thyratron) a negative pulse. The remainder of the L/2 period, this one plate is more positive. This waveform, exemplified at Fig. 1a, line d, with one negative pulse every L/2 period is applied to the A section of the 1600 microsecond delay circuit (see Fig. 4 for details), and there amplified and inverted. The inverted wave is differentiated by capacitor 84 and resistor 86 combination. The differentiated waveform provides a positive pulse every L/2 period, and the constants are adjusted so that the B section (right hand) is conductive, for only slightly over 1600 microseconds.

Figure 4:
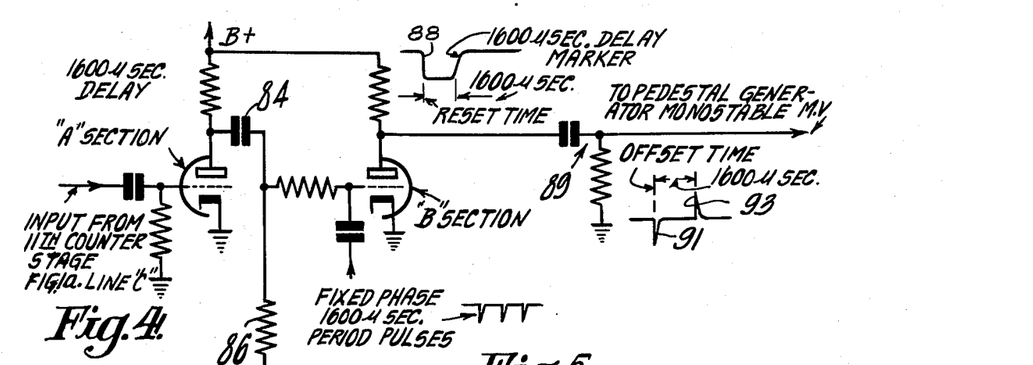
Fig. 4 is a circuit diagram schematically illustrating a 1600 microsecond delay circuit which is driven by the fixed phase 1600 microsecond pulse output shown in block form in Fig. 1.

This gating produces a negative pulse of a little over 1600 microseconds pulse width. In this period of time, there occurs at least one of a series of fixed phase pulses of 1600 microsecond repetition rate, shown at Fig. 1a, line b. This one marker pulse of 1600 microsecond repetition rate is amplified by the 1600 microsecond delay circuit, B section, along with the gate, to produce an output wave 88, Fig. 4. The B section of the tube of the circuit of Fig. 4 is cut-off sufficiently so that only one marker pulse, a 1600 microsecond delay marker, the first occurring after the re-set by the repetition rate thyratron, is thus amplified.

Figure 9:
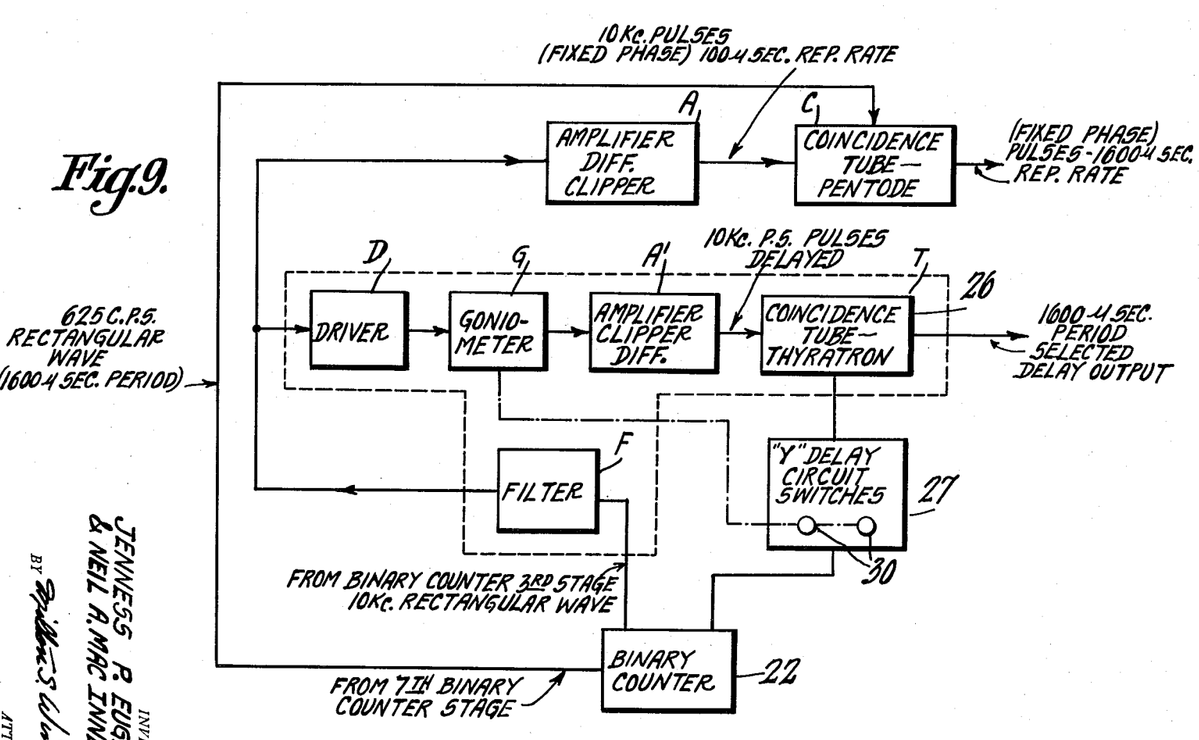
Fig. 9 is a block diagram illustrative of a part of the diagram of Fig. 1.

One manner in which these fixed phase marker pulses may be obtained is illustrated in Fig. 9. A 10 kilocycles per second (kc./s.) sine wave is derived from a filter F coupled to the third binary stage of the counter 22. The 10 kc./s. sine wave is applied to an amplifier, differentiator, and clipper A, to produce 10 kc./s. repetition rate marker pulses of fixed phase (to distinguish from variably delayed marker pulses also derived in this Loran receiver) and positive polarity. The fixed phase marker pulses are applied to one grid of a coincidence pentode tube C. A rectangular wave of 1600 microsecond period from the third counter stage is applied to another coincidence tube pentode grid. This latter wave is re-set every L/2 period by the re-set pulse from the repetition rate coincidence circuit. That anode of this third multivibrator is selected which becomes positive with the re-set pulse. The pentode coincidence tube is normally biased to cut-off. The tube conducts only when the voltages on both grids are positive. Hence a fixed phase marker pulse occurring every 1600 microseconds is generated. The first of these to occur after reset time is selected in the 1600 microsecond delay circuit as shown and described in Fig. 4. The components A and C may, if desired, be considered a part of the 1600 microsecond delay circuit.

The variable phase marker pips of the Y or W delay marker coincidence circuit 26 or 28 may be generated also as illustrated in Fig. 9. The filter F may be used in common with the delay marker coincidence circuits 26 and 28, as well as to produce the fixed phase 1600 microsecond marker pulses. Thus all of the marker pips are referenced to the same 10 kc./s. sine wave for improved accuracy.

A driver or amplifier D amplifies the sine wave, which is passed through a goniometer G, wherein the phase of the 10 kc./s. wave may be changed continuously. The wave is then amplified and clipped and differentiated in amplifier, clipper, and differentiator A', which may be the same as the component A performing a similar function. A coincidence tube T receives the differentiated pulses. The switches 27 and dials 30 may be arranged and mechanically connected as in the said Oda application. The selected phase delayed marker pips, occurring every 1600 microseconds and of positive polarity, may pulse a marker coincidence thyratron. Thus the Y delay marker coincidence circuit 26 includes the components F, D, G, A', and T. A similar W delay marker coincidence circuit 28 is arranged, and may use the same filter F in common. The output thyratrons of the two delay marker coincidence circuits may have a common cathode load for the mixing network 46 of Fig. 1, to mix the delay marker pips. Each thyratron also has a separate anode load from which the delay marker pip, Y or W, each of 1600 microsecond period, may be separately taken.

If desired, by suitable switching, the now single, now double pulses of the Oda application may be used as pedestals directly for the coincidence thyratron of T, which is arranged to fire only when there is superimposed on this pedestal the 10 kc./s. pulses from A'. This may be done in a manner which will be apparent to those skilled in the art with the said Oda application available.

The output waveform 88 (Fig. 4) is differentiated as at 89 and applied to a monostable multivibrator in the pedestal generator 36 of Fig. 1. The differentiation of waveform 88 (Fig. 4) results in two negative and two positive pulses as shown in waveform 91. The positive pulse 93 caused by the 1600 microsecond delay marker triggers the monostable multivibrator in pedestal generator 36, Fig. 1. Hence the fixed phase 1600 microsecond delay marker waveform causes the pedestal generator to produce a pulse initiated 1600 microseconds (approximately) after every reset time of the counter 24 of the system, every L/2 period. The pedestal generator pulse is about 1200 microseconds long, corresponding to the recovery time of the monostable multivibrator of the pedestal generator 36. This pedestal pulse, amplified, is applied to the oscilloscope 18 and is shown as master pedestal pulse 90 or 92 of Fig. 2, and its waveform is shown at line e, Fig. 1a.

Thus, the Y and W delay circuit and switches 27 and 29, by the dials 30 and 32 respectively, control the Y and W delay marker coincidence circuits 26 and 28 respectively, to produce output pips precisely timed and which may be shifted continuously in delay time, by means of a goniometer controlled by the dials, as more fully disclosed in the said Oda application, and as briefly described above.

The mixed output of the Y and W delay marker coincidence circuits from mixing circuit 46 is applied to the pedestal generator 36, to generate a pulse for each of the Y and W delayed pips from the Y and W delay marker coincidence circuits. The Y pedestal is shown as 94 and the W pedestal as 96 in Fig. 2, and also see line f of Fig. 1a.

It may be noted that the master pedestals 90 and 92 of Fig. 2 are delayed from the start of the sweeps. The sweeps are initiated with the re-set pulse, which is a strong pulse. It causes transients in the equipment which might lead to inaccurate readings. For this reason, the master pedestals 90 and 92 are initiated with the 1600 microsecond delay.

The master gain multivibrator 48, delayed L/2 multivibrator 52, Y gate amplifier 42, W gate amplifier 44, and time sharing gain amplifiers will be described in greater detail hereinafter. For the present, it may be stated that these circuits provide independently adjustable gain control of the receiver during the periods of: (1) the master pedestals 90 and 92, when one gain control voltage is applied to the receiver, (2) the Y pedestal 94 when a second gain control voltage is applied to the receiver, and (3) the W pedestal 96 when a third gain control voltage is applied to the receiver.

From the foregoing, the operation of the system may now be understood, with special reference, first, to Fig. 2. When the repetition rate coincidence circuit 25 is set to within a few cycles per second of the repetition rate of the master transmitter, the horizontal sweep generator falls in step with the transmitter pulses. The automatic frequency control circuits are not described, as these are known in the art. The pedestals and pulses then appear on the two lines of the cathode ray tube traces. However, although the master pedestals 90 and 92 appear as shown, the master transmitter pips 60 and 66 may not be superimposed on them. To cause them to assume their proper position, a few of the counter stages may be caused to miss counts or counts may be added, in known fashion. This causes the pips 60 and 66 to drift to right or left until they appear in the proper position as shown.

Now the Y and W pedestals 94 and 96 may not appear under the Y and W transmitter pips 64 and 68. The operator adjusts the W delay marker coincidence circuits 28 of Fig. 1 by the dials 32 to move the W pedestal 96 along the lower trace line until it is under the W pip 68 from the W slave transmitter. The operator also adjusts the Y delay marker coincidence circuit 26 by the dials 30 until the Y pedestal 94 is under the Y slave transmitter pip 64. When the slave pips occupy the same positions on their respective pedestals that the master pips occupy on their pedestals, the delay between reception of the X and W pulses will be the same as the delay between X and W pedestals 90 and 96. This delay may be read on the W dials 32 to provide a Loran reading. The Y delay between reception of the Z and Y pulses may be read on the dials 30 to provide a second Loran reading. This is a coarse adjustment.

*Medium readings*

Figure 1A:
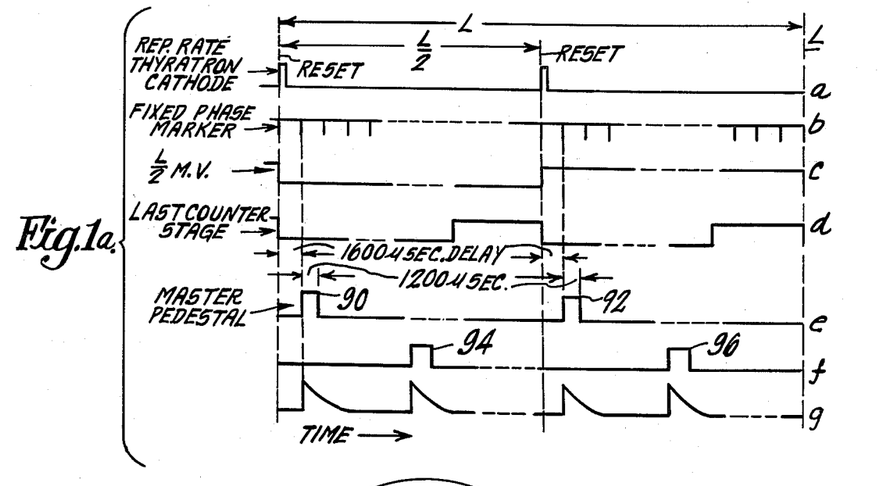
Fig. 1a is a plot of waveforms useful in understanding a part of the embodiment of Fig. 1 illustrated in Fig. 9.

Closer readings may be secured by switching various components. The dotted line connections shown in Fig. 1 are opened. The dot-dash connections are made. The pedestal amplifier 38 is disconnected from oscilloscope 18 and connected to the horizontal sweep generator 59. Each pedestal pulse is now applied to the sweep generator through a differentiator to initiate a horizontal sweep with initiation of the pedestal. The horizontal sweep waveform for this operation is illustrated at Fig. 1a, line g. Conventional circuitry for generating such sweep circuits is known. See, for example, Waveforms, by Chance and others, vol. 19, Radiation Laboratory Series. At the same time the bias on the sweep generator is changed by a switch (not shown) to increase the horizontal output sweep amplitude. The delayed L/2 multivibrator 50 and the master gain multivibrator 48 are connected to the vertical deflecting plates 16 of oscilloscope 18. The output of the master gain multivibrator to the oscilloscope 18, as will appear more fully hereinafter, is a pulse having a time duration equal to the delay of the master pedestal from the firing of the repetition rate thyratron (1600 microseconds approximately) plus the duration of the master pedestal (about 1200 microseconds). In other words, with each L/2 period, every time the repetition rate thyratron fires, there is generated by the master gain multivibrator 48 a pulse of about 2800 microseconds duration.

The delayed L/2 multivibrator 50, as will be shown, produces a square wave form of period L, but delayed for 1600 microseconds plus pedestal duration with respect to the waveform of the L/2 multivibrator 40. That is, the delayed L/2 multivibrator 50, is a bistable multivibrator, changing conductive state at each moment 1600 microseconds plus pedestal duration after the firing of the repetition rate coincidence thyratron.

Figures 5, 6:
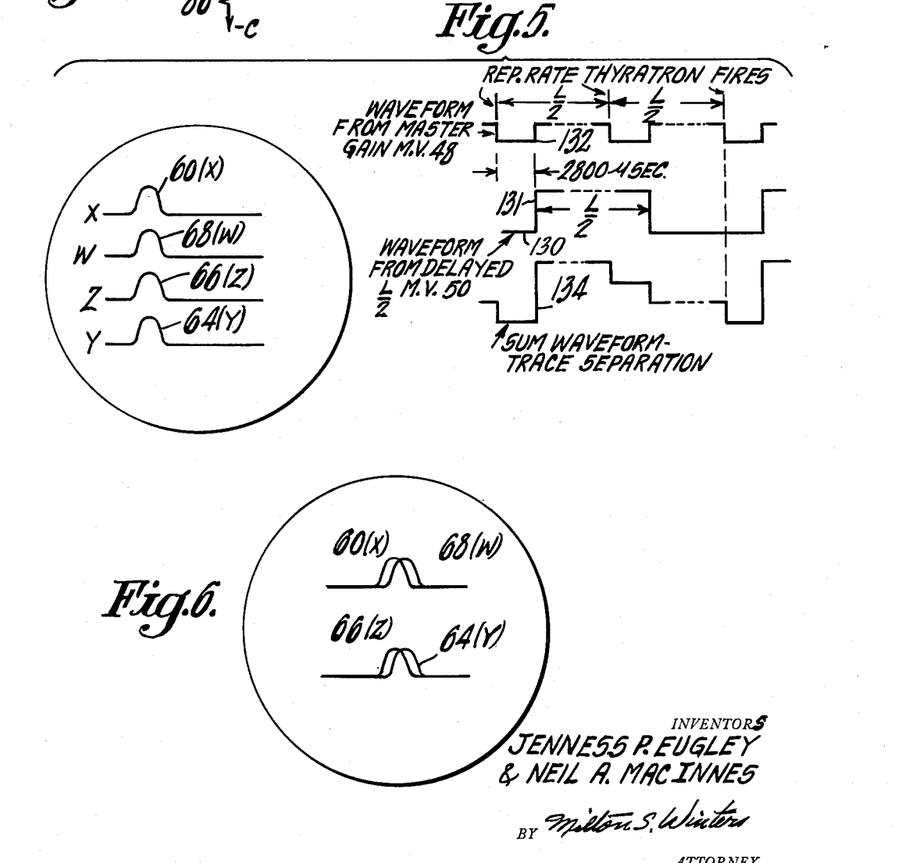
Fig. 5 is an illustrative sketch of a Loran indicator oscilloscope screen in triad operation, for dual presentation, medium adjustment.
Fig. 6 is an illustrative sketch of a Loran indicator oscilloscope screen in triad operation, for dual presentation, fine adjustment.

For convenience, waveforms applied to the oscilloscope 18 from the delayed L/2 multivibrator 50 and from the master gain multivibrator 48 are shown in Fig. 5 adjacent the oscilloscope face view there shown. In Fig. 5, the waveforms are shown as applied to the lower of a pair of vertical deflecting plates. Their sum is similarly shown. The waveform 130 from the delayed L/2 multivibrator 50 has a greater amplitude than that 132 from the master gain multivibrator 48. It will be apparent that the sum waveform 134 is: (1) most negative during the time of occurrence of the X pedestal, (2) most positive during the occurrence of the Y pedestal, (3) less negative than the most negative value during the period when the W pulse must occur, and (4) in the period when the Z pedestal occurs, is intermediate between the value during the periods when the W and Y pedestals occur.

Meanwhile, each pedestal is differentiated in the sweep generator 59, as mentioned, and causes a sweep voltage to be initiated with each pedestal. The sweep circuit may be of any suitable kind. Such circuits are shown, for example, in chapter 7 of "Waveforms," vol. 19 of the Radiation Laboratory Series. Suitable blanking voltages to blank the return trace may also be generated and applied in known fashion. As the coarse adjustment has already assured the occurrence of the pips during the 1200 microsecond period pedestals, the pulses appear as shown in Fig. 5, but possibly misaligned. The operator now adjusts the Y and W delay coincidence circuits. As the W delay circuit dials 32, for example, are manipulated, the sweep for the W pip is initiated at a different time relative to receipt of the pip 68. The pip therefore appears to shift to left or right on its baseline. The manipulation is made to bring the pip 68 as near as possible under the pip 60. Similarly, dials 30 are manipulated to bring pip 64 into alignment with pip 66. Pips 60 and 66 will automatically be aligned if the equipment and master transmitter are in proper adjustment, as will be understood, because the master pedestals are timed with the master transmitter, and the pips 60 and 66 must occur at exact L/2 periods. Hence if all is in proper order, the pips should appear as in Fig. 5.

Fine adjustment

For fine adjustment, the waveform from the master gain multivibrator 48 is disconnected from the vertical plates 16 of oscilloscope 18. At the same time, the constants of the horizontal sweep generator 59 are further changed to still further elongate the sweep, to give a still further enlargement of the sweep along the time or X axis. Only the waveform from the delayed L/2 multivibrator 50, 130 of Fig. 5, is applied to the lower vertical deflecting plate of oscilloscope 18. The resultant appearance of the oscilloscope is as shown in Fig. 6. The deflection waveform of the delayed L/2 multivibrator 50 (shown in Fig. 5) provides a negative voltage during the periods of the X and W pedestals, and a positive voltage during the Z and Y pedestals. The received demodulated pips or pulses are applied to the upper vertical deflecting plate of oscilloscope 18.

The operator now again manipulates the W and Y dials, again adjusting the initiation of the respective W and Y pedestals, with respect to the occurrence of pips 68 and 64. These pips may thus be brought into coincidence with the master transmitter pips 60 and 66 shown slightly out of coincidence in Fig. 6. It will then be understood that the delay between reception of pips 60 and 68 (X and W) is the same as the delay between inception of the X and W pedestals, and the delay may be read on the dials 32 and suitably interpreted on a Loran map made for the purpose. Similarly, the delay between the Z and Y pips may be read from the dials 30. A fix for the plane carrying the equipment is readily found from the information thus supplied.

Single presentation

One of the features of the apparatus described is that it is suitable for employment for a single pair of Loran stations, as well as for triad operation. One of the features of the invention is that the novel circuit selectively provides independent gain control for the master and slave received pips in paired operation, that is, for receipt of signals from a single pair of Loran stations, or independent gain control for the two master and two slave received pips in triad operation, as desired.

In single presentation, paired operation, for example, there may be received signals from a master (only one pip every Loran period) and from a slave (only one pip every Loran period in the second half thereof). The appearance of the oscilloscope is then modified, in coarse reading, from what is shown in Fig. 2 in the following fashion: The pedestal 94 and pip 64 are omitted, as also are the pedestal 92 and pip 66. This is accomplished by disabling the W delay coincidence indicator circuit, and triggering the 1600 microsecond delay circuit 34 from the L/2 multivibrator 40 to provide only one master pedestal to occur during each Loran period. The slave pedestal occurs by reason of the pulse fed from the Y delay marker coincidence circuit 26 to the pedestal generator 36. This also requires a modification in the Y delay circuit switches 32 to invert the waveform applied from the last stage of counter 22, by changing to the other multivibrator anode of the last counter stage. Thus the Y delay marker coincidence circuit 26 takes on the role of the W delay marker coincidence circuit 28. Of the two transmitters used in paired operation, one is employed as master and is identified by always being received more than a half Loran period (L/2) before the slave.

For medium readings, for single presentation, as there are only two pedestals generated each Loran period of L, the oscilloscope appears as in Fig. 5, with the Z and Y lines absent. Only waveform C of Fig. 1a is applied to the lower oscilloscope 18 deflecting plate. The pulses are aligned vertically as before to secure a more accurate reading.

For fine reading, the screen appears as in Fig. 6, but with the second line missing, and the two pulses (corresponding to X and W) are superimposed for accuracy. No deflecting waveform is applied to the lower vertical deflecting plate of oscilloscope 18.

Matching problems

The matching of the received pips performed as described in connection with Figs. 2, 5 and 6 appears at first quite simple. In practice, however, difficult problems are met. Spurious sky wave signals may be present. The primary signals from the stations are usually unequal in amplitude, and the inequality is not always dependent on distance, but depends on transmission conditions. In the alignment operation of Fig. 5, but more especially in the superposition or matching operation of Fig. 6, accuracy of a practical nature is difficult to achieve unless the received pips to be matched are of equal amplitude. Former types of gain controls provided such equality, but with the difficulty that the gain controls of the master pips 60 and 66 and of the slave pip 64 were interdependent. Thus if one adjusted the gain control to equalize pips 60 and 68, pips 66 and 64 appeared of different amplitudes. Adjustment of pips 66 and 64 to be equal, upset the previous adjustment of pips 60 and 68. After careful adjustments were made, if conditions had changed for one of the three transmission paths, the entire process of adjustment had to be repeated. With the present invention, these difficulties are overcome.

Time sharing gain circuit

Figure 7:
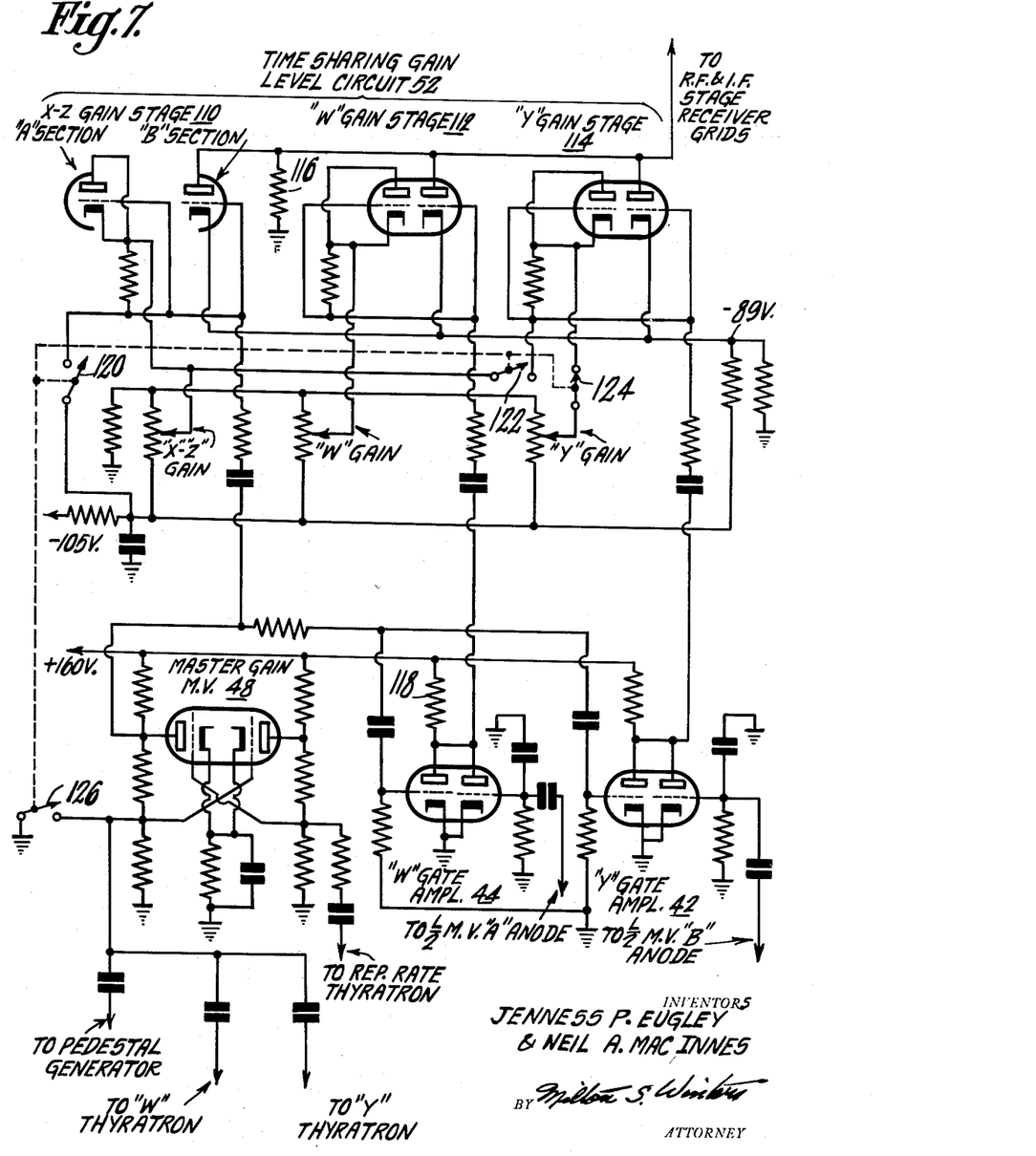
Fig. 7 is a circuit diagram schematically illustrating the gain control circuits shown in block form in Fig. 1.
Figure 8:
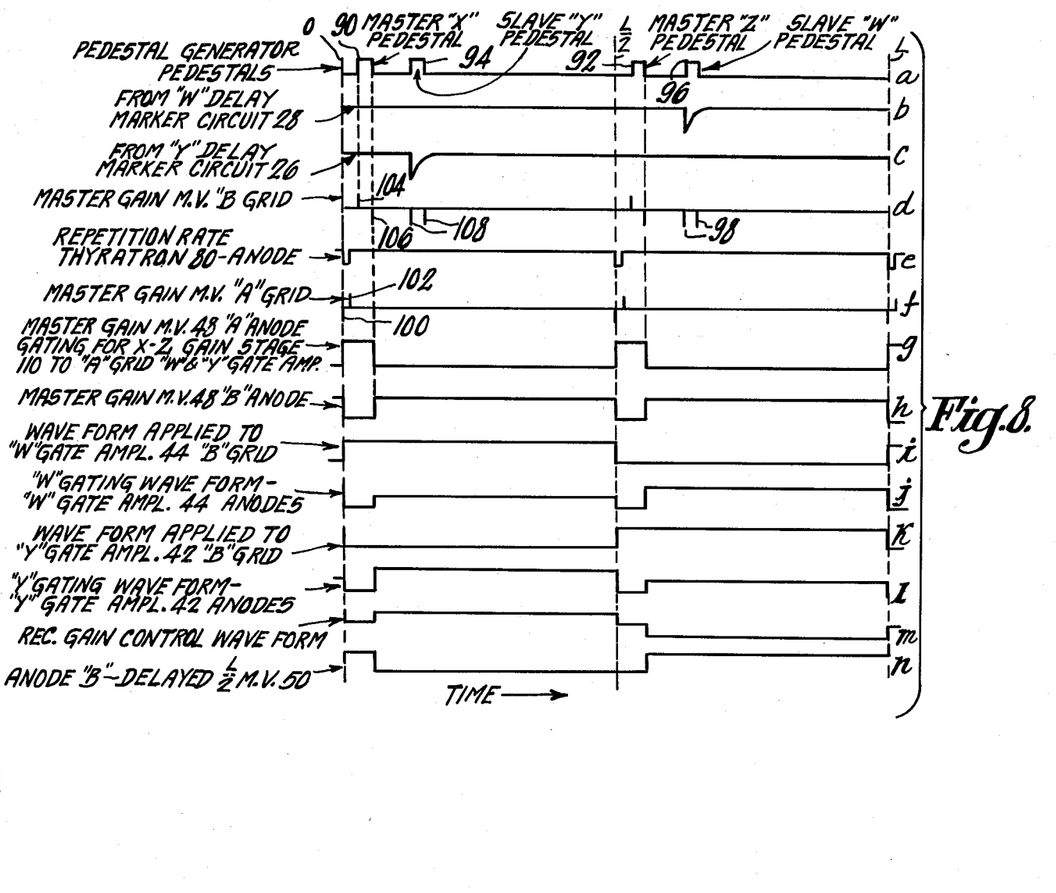
Fig. 8 is a plot of waveforms explanatory of the circuits of Fig. 7.

Referring to Fig. 7, the time sharing gain control circuits are shown in detail. The master gain multivibrator 48 is a bistable multivibrator of known type. Pulses from the repetition rate thyratron anode are differentiated and applied to the grid of the A section (always the left-hand section of the double triodes shown, in accordance with usual convention) of the multivibrator tube. Pulses from the pedestal generator 36, the Y delay marker coincidence circuit 26, and the W delay marker coincidence circuit 28 (the latter two from the mixing network 46) are differentiated and applied to the B section of the master gain multivibrator 48. Waveforms are shown in Fig. 8. See lines a, b, c and d. From line d, it will be observed that the differentiated leading edge of the slave pedestals for the Y and W pedestals are overriden by the differentiated leading edge of the output of the Y and W delay marker circuits.

The grid of the A section of the master gain multivibrator receives a differentiated pulse from the repetition rate thyratron 80 anode, as shown in lines e and f, Fig. 8.

The action of the master gain multivibrator 48 of Fig. 7 may be understood from lines d and f, Fig. 8. Just before the start of the cycle (with firing of the repetition rate thyratron 80), the master gain multivibrator 48 B section will be in a non-conductive state and the A section in a conductive state, due to differentiated pulses 98. The pulse 100 from the differentiated leading edge of the timing pulse from the repetition rate thyratron 80, causes the A section to cut off, and the B section to become conductive. The trailing edge of the pulse from the repetition rate thyratron 80 anode has a gradual rise, so that no appreciable pulse follows the pulse 100 due to the repetition rate thyratron 80 firing. The B section is already conductive, so pulse 104 on the B section grid causes no change in the state of the master gain multivibrator 48. The next pulse 106 on the B section grid, being negative, cuts off the B section. The only pulses on the grids for the remainder of the half cycle (L/2) are the negative pulses 108 on the B section grid, which is already cut-off, so that these cause no change of state. These do assure, however, that the master gain multivibrator 48 is always in the proper state for the next succeeding cycle.

The resultant waveforms on the anodes of the master gain multivibrator 48 are shown in lines g and h, and are repeated each half cycle. The A section anode waveform is a positive pulse, initiated with firing of the repetition rate thyratron 80 and terminating with the termination of the next following X or Y pedestal, as the case may be. The section anode waveform is similar but of opposite polarity.

The output waveform from the A section plate is used as a "gate" voltage for an X—Z gain stage 110, part of the time sharing gain level circuits 52. There are also a W gain stage 112 and a Y gain stage 114. See Fig. 7. Although shown as two "B" sections of different triodes, as the gain stages 110, 112 and 114 are electrically alike, the left-hand of the pair of triodes of X—Z gain stage 110 will be described as an A section and the right-hand triode as a B section, and their joint action is similar (although differently timed and different in output, as will be seen) to that of the W and Y gain stages 112 and 114.

All the B section cathodes of gain stages 110, 112 and 114 are connected, by a voltage divider system, of common cathode resistors, to a point below ground. Exemplary voltages are labelled on the circuit. Each B section grid is returned through a grid resistor to its A section cathode. All the B section anodes of the gain stages 110, 112 and 114 are connected to ground through a common load resistor 116. Bias voltage for the R. F. (radio frequency) and I. F. (intermediate frequency) stage grids of the receiver is developed across this common load resistor 116 in synchronism with the positive gating voltage applied to each B section grid. The A section tube of each gain stage 110, 112 or 114 is diode connected with the triode grid serving as the diode anode, and the triode anode short-circuited to the triode cathode. Each diode or A section cathode is returned to the arm of a gain potentiometer. Each potentiometer resistor is inserted as a resistor in a resistor network voltage divider circuit so that the arm picks up a negative voltage as selected by the operator.

The W gate amplifier 44 is composed of two self-biased triodes with a common anode load resistor 118. With one or both triodes conductive, the anode voltage is low. If both grids are biased to or below cut-off at the same time, the anode voltage rises substantially to the B+ supply. Now, one grid (A section) receives voltage from the A section anode of the master gain multivibrator (waveform shown at line g of Fig. 8), while the other grid (B section) is connected to the L/2 multivibrator 40, (waveform line i of Fig. 8). Thus the only times both grids of the W gate amplifier 44 are negative in a cycle is between the termination of the Z pedestal and initiation of a new cycle. The resultant positive voltage (waveform line j of Fig. 8) is applied as gating voltage to the B section of the W gain stage 112.

The Y gate amplifier 42 is similar to the W gate amplifier 44, and its A section grid receives voltage also from the A section anode of master gain multivibrator 48, except that the B section grid of the Y gate amplifier receives an input from the B section anode of the L/2 multivibrator 40 (the inverse of line i of Fig. 8). The Y gate amplifier 44 output waveform is shown at line l, Fig. 8.

*Operation of gain control circuits of Fig. 7*

A. *For triad operation.*—The common anode resistor 116 together with the relative biases between the B section cathodes and grids helps assure that only a single B section of the three stages 110, 112 and 114 of the time sharing gain level circuits 52 of Fig. 7 can conduct at one time. Also, this action is further assured because of the common cathode resistors and because each grid is gated to conduct when the others are non-conducting, by the most positive going portions of the waveforms lines g, j, and l of Fig. 8, applied to it. As will be apparent from these last-mentioned waveforms, these most positive going waveforms are mutually exclusive in time, and also substantially mutually exhaustive of each period L. Therefore, the YB sections of the gain stages 110, 112, 114, conduct in the following order (for a complete cycle—dual presentation): X—Z stage 110 B section, from start of cycle to termination of X master pedestal; W gain stage 112 B section, from termination of X master pedestal to half period L/2; X—Z stage 110 B section, from end of half period L/2 to termination of Z master pedestal; W gain stage 114 B section, from termination of Z master pedestal to firing of repetition rate thyratron 80 and start of new cycle.

As each B section of each gain stage conducts, however, its grid voltage is limited by limiting the most positive going portion of each waveform, by the A sections acting as grid clamps or limiters. Moreover, the clamping action itself may be selectively controlled for each gain stage by reason of the potentiometers, which are the respective gain controls which may be manually set by the operator. The output voltage may be varied from about —0.1 volt to about —35 volts with respect to ground, independently adjustable for each gain stage, to be supplied to the receiver.

It is now apparent, from the mutually exclusive and mutually exhaustive timing, that one gain voltage is effective at the receiver during receipt of the X and Z pulses from the master transmitter. Another gain voltage is effective during receipt of the Y pulse from the Y slave transmitter. A third gain voltage is effective during receipt of the W pulse from the W slave transmitter. It may be noted that the 1600 microsecond delay also affords time for the receiver to reach the new gain level in response to each change of gain control level, before the master pulses are received, and in any practical cases, before the slave pulses are received.

B. *For paired operation.*—For paired operation, when it is desired to consider only a pair of Loran stations, or a pair of triad stations, the X—Z gain stage 110 is made inoperative, by biasing the B section to cut-off. This is done by operating a "single-dual" switch, Fig. 7, having contacts 120 open for triad presentation. At the same time contacts 122 of the same switch, open for triad presentation, are closed, and contacts 124 of the same switch, closed for triad operation, are opened. The master gain multivibrator 48 is made inoperative by contacts 126 of the same switch, open in triad operation, closed for dual operation to ground the A section grid.

Since the master gain multivibrator 48 is inoperative, the Y gating waveform applied to the B section grid of the Y gain stage 114 reduces to the waveform from the Y gate amplifier 42, which is now receiving no signal on its A section grid. Therefore Y gate amplifier 42 merely inverts the waveform of line k of Fig. 8 for its output waveform at the anodes of Y gate amplifier 42. Similarly, the W gate amplifier 44 waveform output is that of Fig. 8, line i, inverted. Hence the Y gain stage 114 is operative the first half cycle 42 after firing of the repetition rate thyratron, and the W gain stage 112 for the succeeding 42 period. In dual operation, furthermore, the Y delay marker coincidence circuit 26 of Fig. 1 is made inoperative, as by depriving its output tube of anode voltage. Therefore, no slave Y pedestal is generated. Then only the W delay marker coincidence circuit 28 is operable. At the same time the 1600 microsecond delay circuit 34 is connected by contacts 128 to the 42 multivibrator 40. The appropriately phased output anode of the 42 multivibrator is selected so that only one 1600 microsecond delay circuit 34 output pulse occurs in the first half L/2 of each Loran period and thus only one master pedestal is generated. Hence in this mode of operation, for paired operation, the X—Z gain control controls the receiver gain (through the Y gain stage 114) during the first half Loran period, in which the desired master pulse from the master transmitter is being received. The W gain stage 112 and W gain control control the gain of the receiver during the latter half of the period when the desired slave signal is being received.

If it is desired, in paired presentation, to use the Y delay system, the W count may be retained, if desired, by disabling the W delay coincidence circuit 28, and use the Y delay coincidence circuit 26, changing the input to the latter from the 42 multivibrator to opposite polarity. Similarly, other changes in polarity may be required if this is done. However, as these are within the ready skill of those familiar with the art, they need not be further discussed.

What is claimed is:

1. A gain control voltage circuit comprising a plurality of stages, each stage having cathode, anode, and control elements, an anode-to-cathode element load circuit in common with all of said stages, each stage having individual to itself a clamping circuit connected to its respective control element to limit the positive-going excursion of a waveform applied to its said control element, means to develop the same plurality of waveforms during a cycle as the plurality of said stages, each of said waveforms having a positive-going portion more positive than any other portion of that waveform, said positive-going portions occurring in mutually exclusive and mutually exhaustive time intervals, said means being connected to apply each of said waveforms to a different one of each of said control elements.

2. A gain control voltage circuit comprising a plurality of amplifying stages, each stage having cathode, anode, and control elements, and each having an anode-to-cathode circuit with a load in common for all of said amplifying stages, each stage having individual to itself a clamping circuit connected to its respective control element to limit the positive going excursion of a waveform applied to said control element, a plurality of gating circuits of the same number as said plurality of amplifying stages, each said gating circuit being interconnected with the others to provide a waveform from each having a most positive going excursion during a time mutually exclusive of the most positive going portion of any other, each said gating circuit being connected to apply its said waveform to one and only one of said control elements.

3. The gain control voltage circuit claimed in claim 2, each said stage comprising a vacuum tube having a cathode, an anode, and a control grid which are, respectively, said cathode, anode, and control elements.

4. A gain control circuit for a Loran receiver comprising three gain level amplifiers each having anode, cathode, and control elements, and anode-to-cathode circuits, a load in the anode-to-cathode element circuit in common with all of said amplifiers, each stage having individual to itself a clamping circuit connected to its respective control element to limit the positive going excursion of a waveform applied to said control element, a pair of gate amplifiers each one comprising a pair of amplifying devices each having anode, cathode, and control elements, and an anode-to-cathode element circuit each of said gate amplifiers having individual to itself a load in common with the said anode-to-cathode element circuits of its said pair of devices, said gate amplifiers each being connected to apply the signal developed across each load to one and only one of said gain level amplifier control elements, a rectangular wave generator connected to apply its rectangular wave output to the remaining one of said gain level amplifier control elements and connected to apply the same rectangular wave output to the control element of one and only one device of each pair of devices.

5. The circuit claimed in claim 4, further comprising a second rectangular wave generator having two output waveforms one like the other except for polarity inversion, said second rectangular wave generator being connected to apply one of its said two output waveforms to the other control element of one of said gate amplifiers, and to apply the other of its said two output waveforms to the other control element of the other of said gate amplifiers.

6. The circuit claimed in claim 5, each of said rectangular wave generators being a bi-stable multivibrator.

7. The circuit claimed in claim 4, said rectangular wave generator being a bi-stable multivibrator.

8. A Loran receiver comprising means to receive and demodulate pulses transmitted from three geographically separated stations, one of which is a master station transmitting master X pulses at intervals of time L, and also master Z pulses at intervals of time L spaced L/2 in time from said master X pulses, another of said stations transmitting slave W pulses at intervals of time L in W slave intervals of time after transmission of each said master Z pulse and before the next master X pulse, and the third of said stations transmitting slave Y pulses at Y slave intervals of time L in the intervals of time after each said master X pulse and before each said master Z pulse, means to develop a waveform having one most positive going portion from prior to reception of said master X pulse until after termination of said master X pulse and from prior to reception of said master Z pulse until after termination of said master Z pulse with a period of L/2, means to develop a second waveform having its most positive going portion during said same W slave intervals, and means to develop a third waveform having its most positive going portion during said Y slave intervals of time; a gain control voltage circuit comprising a plurality of stages, each stage having cathode, anode, and control elements, an anode-to-cathode element load circuit in common with all of said stages, each stage having individual to itself a clamping circuit connected to its respective control element to limit the positive going excursion of a waveform applied to its said control element, each of said waveform developing means being connected to one and only one of said gain control stage control elements, the waveform developed across said common load circuit being applied as a gain control voltage to said means to receive and demodulate pulses.

9. The receiver claimed in claim 7, said means to receive and demodulate pulses including radio frequency and audio frequency amplifying stages at least one of which has a control element the voltage applied to which controls the amplitude of the demodulated pulse, said waveform developed across said common load circuit being applied to said amplitude controlling element.

10. A gain control voltage circuit comprising a plurality of tubes, each tube having a cathode, an anode, and a control grid and each having an anode-to-cathode circuit, a load resistor common to said anode-to-cathode circuits, a diode clamp tube one for each of said plurality of tubes and each clamp tube connected individually to one and only one of said plurality of tubes to limit the positive going excursion of a waveform applied to its said control grid to a value individual to each depending on the return connection of each said clamp tube, means to develop the same plurality of waveforms during a cycle as the plurality of stages, each said waveform having a positive going portion more positive than any other portion of that said waveform, said positive going portions occurring in mutually exclusive time intervals and substantially exhaustive of the periods of the longest periods of said waveforms, said means being connected to apply each of said waveforms to a different one of each of said control grids.

11. A gain control circuit comprising three gain level tubes each having an anode, a cathode, and a control grid, an anode load resistor common to said tubes and a cathode resistor common to said tubes, a clamping diode for each tube connected to the said control grid thereof and returned each to an individual voltage level to limit individually the positive going excursion of any waveform applied to each grid, two pairs of gate tubes, each tube having an anode, cathode, and control grid, a pair of resistors, each connected in common to the anodes of one pair of said gate tubes and not to the other, the said anodes of one pair being connected to one and of the other pair to the other of two of said gain level tube control grids to apply thereto the waveform developed across said gate tube load resistors, a multivibrator having one anode connected to the third said gain level tube grid and also to one grid of each pair and not to the other grid of each pair of gate tubes.

12. The gain control voltage circuit claimed in claim 2, said plurality of amplifying stages having a cathode resistor connected in common to all said cathode elements, said load comprising a resistor connected in common to all said anode elements.

13. A Loran receiver comprising means to generate cyclically master pedestals at spaced successive intervals of time, means to derive a master gain control voltage, means to derive at least one slave gain control voltage, said gain control voltages being independently derived, voltage responsive receiver gain control means, means cyclically to apply to said voltage responsive means in successive mutually exclusive intervals of time, said gain control voltages as follows: said master gain control voltage from a moment just prior to inception of one of master pedestals to termination thereof; the first of said slave gain control voltages from termination of said one master pedestal to a moment just prior to inception of the next master pedestal; the said master gain control voltage from a moment just prior to inception of the next master pedestal to termination thereof; the next slave control voltage from said termination of said last named master pedestal to a moment just prior to inception of said next master pedestal; and so on, all the slave gain control voltages being thus applied in order with intervening periods of application of said master gain control voltage.

14. A Loran receiver for triad operation, comprising means to generate a master X pedestal every predetermined period of time L, means to generate a master Z pedestal every predetermined period of time L and spaced in time midway between said X pedestals, means to derive a master gain control voltage, means to derive a W slave gain control voltage independently of said master gain control voltage, and means to derive a Y slave gain control voltage independently of said other gain control voltages, voltage responsive receiver gain control means, means cyclically to apply to said voltage responsive means in successive mutually exclusive intervals of time said gain control voltages as follows: said master gain control voltage from a moment just prior to inception of said X pedestal to termination thereof; said Y gain control voltage from termination of X pedestal to a moment just before inception of said Z pedestal; said master gain control voltage again from said last mentioned moment to termination of said Z pedestal; and said W gain control voltage from termination of said Z pedestal to said first moment.

15. A Loran receiver for triad operation, for receiving master pulses alternately designated X and Z, at regularly spaced predetermined periods of time L/2, and for receiving slave pulses from each of two slave stations, one slave pulse designated W in the interval between reception of each Z and X pulse in that order and one slave pulse designated Y in the interval between reception of each X and Z pulse in that order, said receiver comprising means to control the receiver gain in response to a gain control voltage, means to generate in the receiver one pedestal at time spaced periods L/2 for each received X and one pedestal for each received Z pulse, each said pedestal being of greater duration than each transmitted pulse, means to vary the time of occurrence of said receiver generated pedestals to cause each of said transmitted master pulses to be received during the occurrence of the corresponding receiver generated pedestals, means for generating a W pedestal, means for generating a Z pedestal, each said pedestal being greater in time duration than the corresponding received transmitted slave pulse, means to vary the time of occurrence of said W pedestals, and means to vary the time of occurrence of said Y pedestals, each to cause each received pulse to be received during the occurrence of the corresponding W and Y received slave pulse, means to develop a master gain control voltage effectively applied to said gain control means a predetermined time before initiation of each said master X and Z pedestal to the termination of each said master pedestal, means to develop a second Y control voltage effectively applied to said gain control means from termination of each said X pedestal to the predetermined time of application of said master gain control voltage effective during said Z pedestal, and means to develop a W gain control voltage effectively applied to said gain control means from the termination of each Z pedestal to the predetermined time of application of said master gain control voltage before said X pedestal, the three said gain control voltages being applied throughout the receiver operation, each said gain control voltage having its individual independent means of adjustment.

16. A gain control voltage circuit as set forth in claim 1, and further including means coupled to each of said clamping circuits for individually controlling the clamping level of each of said clamping circuits.

17. In a hyperbolic navigation system, in combination, receiver means for receiving a pair of master pulses recurrent at a given rate and two slave pulses recurrent at said given rate the amplitudes of which may be different from one another and from that of said master pulses; and a balance control system coupled to said receiver means for independently adjusting the gain thereof to a first level during the period of reception of at least one of said master pulses and to levels independent from one another and from said first level during the respective periods of reception of said two slave pulses.

18. In a hyperbolic navigation system, in combination, receiver means for receiving a pair of master pulses recurrent at a given rate and having the same amplitudes and two slave pulses recurrent at said given rate the amplitudes of which may be different from one another and from that of said master pulses; and a balance control system coupled to said receiver means for independently adjusting the gain thereof to a first level during the periods of reception of said master pulses and to levels independent from one another and from said first level during the respective periods of reception of said two slave pulses.

References Cited in the file of this patent

UNITED STATES PATENTS

| 2,472,706 | Hulst | June 7, 1949 |
| 2,599,777 | Pierce | June 10, 1952 |
| 2,651,033 | Frantz | Sept. 1, 1953 |